Figure 1:
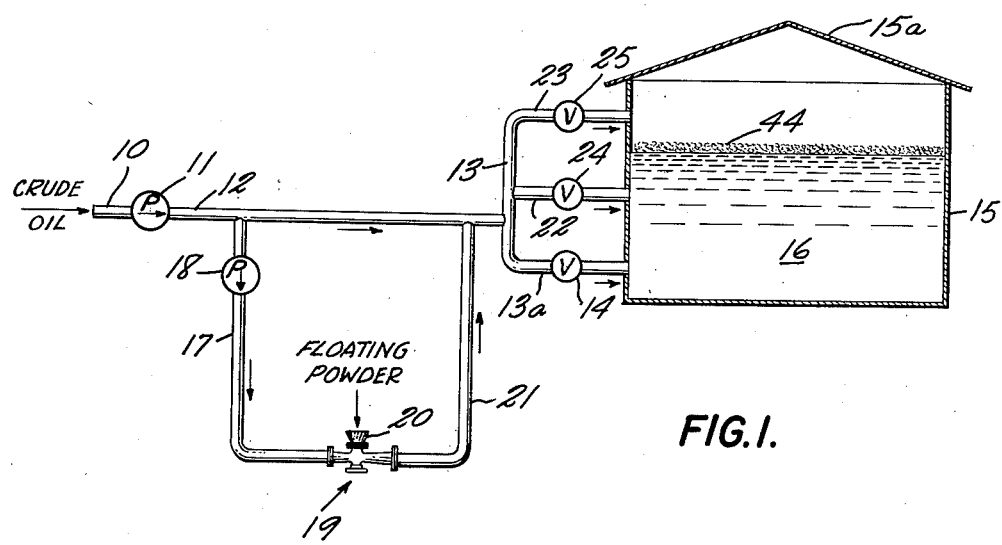

June 25, 1957 F. VEATCH 2,797,140
METHOD FOR COVERING CRUDE OIL
Filed Jan. 28, 1954

INVENTOR.
FRANKLIN VEATCH
BY
Campbell, Brumbaugh, Free & Graves
his ATTORNEYS ited States Patent Office 2,797,140
Patented June 25, 1957

2,797,140

METHOD FOR COVERING CRUDE OIL

Franklin Veatch, Lyndhurst, Ohio, assignor to The Standard Oil Company, Cleveland, Ohio, a corporation of Ohio Application January 28, 1954, Serial No. 406,829

4 Claims. (Cl. 21—60.5)

This invention relates to methods and apparatus for installing a foam on crude oil and analogous products to inhibit the evaporation thereof.

This application is a continuation-in-part of copending applications Serial Nos. 278,496 now abandoned and 389,471, filed March 25, 1952 and October 30, 1953, respectively, by Franklin Veatch and Everett C. Hughes.

In copending application Serial No. 389,471, filed October 30, 1953, in which I am one of the joint applicants, there is described a process for inhibiting evaporation in crude oil by covering the surface thereof with a floating foam comprising individual and discrete small, hollow hole-free particles.

As described in said copending application, these particles may be made from any film-forming material and one method of making them is by spray-drying a solution of a synthetic plastic, such as a phenol-formaldehyde resin with a blowing agent.

The particles are very small and more or less spherical in shape. They are predominantly hole-free and will float on a liquid. The particles have an average diameter of 1 to 500 microns, preferably 25 to 250 microns. They have a bulk density in the range of 0.01 to 0.3 gm./cc. and a liquid displacement density in the range of 0.05 to 0.6. Reference may be had to said copending application for a further description of the particles, their manufacture and use on crude oil.

When these particles are mixed with crude oil as described in said copending application, they are unusually effective in preventing evaporation of crude oil in storage, apparently due to the fact that there are components in the crude oil which function to fill the interstices between the individual particles and thus prevent volatile components of the crude oil from passing through the floating layer. These components, however, are such that a crust-like surface does not form or, at least, it is not so pronounced as to prevent satisfactory resealing upon breaking of the floating layer.

The thickness of said floating layer may vary from a fraction of an inch to several inches, the layers having a thickness of ¼" to 1" having been found entirely satisfactory.

When it is desired to prepare such a floating foam in a small tank, it is, of course, simple to add the floating particles and mix them with the oil. In many large storage tanks in the field the addition of the particles to the tanks presents a problem because the tanks ordinarily are not built with openings through which such large amounts of floating particles can be introduced and mixed with the crude oil to form a floating foam.

Accordingly, it is an object of the present invention to provide for the simple and economical installation of a floating foam on crude oil or analogous products contained in a storage tank.

It is another object of the present invention, to provide apparatus to facilitate the installation of a floating foam including small, hollow hole-free particles on crude oil contined in a storage tank.

These and further objects of the invention are accomplished by providing a venturi through which at least a portion of the crude oil flowing to a tank is passed, means being provided for feeding the small, hollow hole-free particles which are inert to crude oil to the throat of the venturi. In a preferred embodiment of the invention, a portion of the crude oil is bypassed through the venturi, the resultant foam being subsequently reintroduced to the main stream of crude oil flowing into the storage tank through one or more suitably positioned lines.

Figure 2:
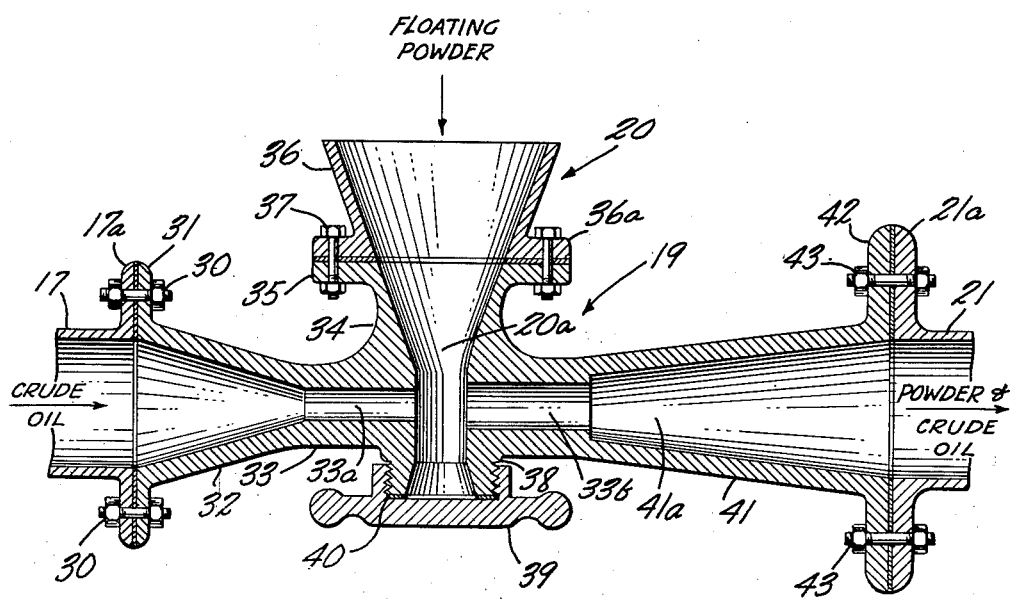

These and further objects and advantages of the invention will be more readily understood when the following description is read in connection with the accompanying drawings in which:

Figure 1 is a schematic flow diagram illustrating apparatus that may be employed in practicing the method of the invention; and Figure 2 is an enlarged view in longitudinal section of the venturi illustrated in Figure 1.

Referring to the drawing in greater detail with particular reference to Figure 1, crude oil, as indicated by the caption and arrows, is introduced into a line 10 and normally forced by a pump 11 through line 12, manifold 13, line 13a and a normally open valve 14 to a storage tank 15 provided with a roof 15a and containing crude oil 16. The line 10 may be a part of a crude oil gathering and distributing system. Except for manholes which are not normally opened, the manifold 13 is the only opening into the tank through which material is added or withdrawn.

Joined to the line 12 is a bypass line 17 through which a pump 18 withdraws a portion of the crude oil flowing in the line 12 and pumps it to a venturi 19 coupled to the line 17. As indicated by the caption, the small, hollow hole-free particles, described heretofore, and referred to hereinafter in bulk as floating powder, are introduced into a hopper 20 leading to the throat of the venturi 19 where it is mixed with the bypassed crude oil to form a foam. This foam is returned through another line 21, coupled to the venturi 19, to be mixed with the crude oil flowing in the line 12, the resultant crude oil floating powder mixture being selectively introduced into the tank 15 through the manifold 13 and lines 13a, 22 and 23 containing valves 14, 24 and 25, respectively. Thus, the mixture of crude oil and floating powder may flow into the storage tank 15 at the desired level or levels of entry of these lines. It is immaterial whether the foam is introduced above or below the oil surface in the sense that in either case, the foam from a single point of entry is uniform in composition and forms a layer of uniform thickness and effectiveness. However, to avoid breaking the foam covering on the oil surface, the foam should preferably be introduced into the tank at a point below the oil surface but above the sludge which often accumulates at the bottom of the tank.

The venturi 19 and the hopper 20 will be described with particular reference to Figure 2 which is an approximate scale drawing wherein 1"=2". The line 17 is provided with a flange 17a joined by a plurality of nut and bolt assemblies 30 to a flange 31 formed on a converging section 32 of the venturi 19. The section 32 leads to a throat section 33 communicating with the hopper 20, which is constructed with a passageway 20a formed by an upwardly arching section 34 integral with the throat 33. A flange 35 at the upper end of the section 34 is joined to a hollow converging member 36, completing the hopper 20, and having a flange 36a on the lower portion thereof joined by suitable nut and bolt assemblies 37 to the flange 35. The passageway 20a leads through the throat 33 to a downwardly protruding threaded portion 38 integral with the throat section 33 and normally sealed by a screw type cover 39 provided with a gasket 40 to guard against leakage. The cover 39 may be removed when it becomes necessary to thoroughly clean the throat 33 and the hopper 20.

A divergent section 41 of the venturi 19 leads from the throat 33 and is provided with a flange 42 which cooperates with a flange 21a on the line 21, nut and bolt assemblies 43 securing the flanges 42 and 21a.

In order to reduce turbulence and to assure a more streamline flow through the venturi 19 while providing for a substantial decrease in pressure in the throat 33, a passageway 33a in the throat 33 initially encountered by the crude oil is of somewhat smaller diameter than a passageway 33b, extending from the hopper passageway 20a. Furthermore, a passageway 41a in the divergent section 41 is abruptly increased in size at the end of the throat 33 to facilitate the flow of crude oil through the venturi 19 with a minimum of friction losses.

In a typical operation of the invention, crude oil is introduced into the line 10 and forced into the line 12 by the pump 11 and to the storage tank 15 through the manifold 13 and the line or lines 13a, 22 and 23 that are open. Simultaneously, the pump 18 draws crude oil through the line 17 and forces it through the venturi 19. At this point, the floating powder is fed into the hopper 20 and mixed with the crude oil in the throat 33, the resulting mixture flowing through the line 21 to the line 12 where it is further mixed with the main stream of crude oil. The resultant crude oil floating powder mixture is introduced into the tank 15 through a desired one or more of the lines 13a, 22 and 23, a consideration being that the sediment and water on the bottom of the tank should not be disturbed by this process.

This method of feeding the floating powder into the hopper 20 so that it is drawn into the throat 33 results in the production of the floating foam as the powder and oil are passing through the venturi 19, the line 21, the manifold 13 and the selected lines 13a, 22 and 23 into the storage tank 15. Thus, upon entering the tank 15, the foam is well formed and in a short time will appear on the surface as a layer of foam 44 having sufficient mobility to spread over all of the crude oil 16 to inhibit evaporation thereof.

It has been found that automatic mixing of the crude oil and the floating powder is assured in the particular venturi 19 disclosed when the pressure of the oil being forced therethrough exceeds about 80 p. s. i. Venturis requiring lower upstream pressures can be designed but the reduced flow therethrough would make their use impractical. With the pressure above this figure, the crude oil has not risen in the hopper 20 and mixed with the floating powder placed therein because the throat pressure is below atmospheric pressure. Furthermore, when the crude oil is forced through the venturi 19 of the size disclosed at a pressure in the range of 80 p. s. i. to 200 p. s. i., preferably 100 to 120 p. s. i., the floating powder and crude oil are automatically mixed together in the correct proportions to afford the desired foam. The pressures much over 200 p. s. i. are undesirable with this size venturi because the floating powder will begin to collapse resulting in the destruction of its usefulness.

The combination of the particles and the crude oil will result, for example, in a foam which has the form of a viscous slurry, the particles constituting from about 20% to 70% by volume of the oil slurry, and preferably 40% to 55%. This protective floating layer composed essentially of the particles and crude oil or components thereof is rendered gas impermeable by virtue of the fact that the crude oil or component thereof is held in place by capillary force between the capillary interstices of these spherical particles.

The thickness of the foam layer installed on the surface of the crude oil must be sufficient to yield an effective reduction or inhibition in evaporation loss. Evaporation tests have shown that a 1" layer of foam will reduce evaporation loss down to about 5% to 20% of the loss encountered with uncovered crude oil. A part of this loss may be due to initial losses while equilibrium conditions are being reached and after the layer becomes a constant composition, the losses are less. The thickness of the layer may vary and for example, a substantial reduction of evaporation is obtained with a layer ⅛" thick. No useful purpose is served by making the layer thicker than about 3".

In an exemplary operation of the invention, assume it is desirable to provide a foam layer on a crude oil (36° A. P. I.) being charged to an 80,000 barrel tank (120 feet in diameter and about 40 feet high). In this instance, it is determined that a phenol-formaldehyde type of particle should be the basis of the foam covering ½" in thickness. Since these particles have a bulk density of about 8.5 and a liquid displacement density of 18.7 lbs./ft.$^3$, it can be determined that 3,960 lbs. of floating powder formed of the small, hollow hole-free particles are required. They may be fed into the hopper 20 at a rate of about 20 lbs. per minute with the crude oil being pumped at a pressure of 100 p. s. i. and a rate of 25 barrels per hour through the venturi 19 (the volume rates of the flow of crude oil and the floating powder may be approximately equal). The resulting mixture is then returned to the main line 12 and introduced into the crude oil tank 15, the entire operation requiring about 3.3 hours. It is preferable to clear the lines 17 and 21 and the venturi 19 by a flow of crude oil therethrough for 15 minutes after the addition of the floating powder through the hopper 20.

It will be understood that the above-described embodiment of the invention is illustrative only and modifications thereof will occur to those skilled in the art. Therefore, the invention is not to be limited to the specific apparatus disclosed herein but is to be defined by the appended claims.

I claim:

1. A method of installing a foam on the surface of crude oil in a tank which comprises passing at least a portion of the crude oil flowing to the tank through a venturi to provide a pressure below atmospheric pressure at the venturi throat, introducing into the flowing crude oil at the throat of the venturi a mass of discrete, spherical, oil-wettable, gas-filled, hole-free particles of a solid material inert to crude oil, which particles have an average diameter from 25 to 250 microns and have a liquid displacement density of from 0.05 to 0.5, and introducing the mixture of crude oil and the mass of particles into the oil tank, whereupon the particles will rise to the surface of the oil and form a foam in which the particles will occupy about 20 to 70% by volume of the foam.

2. A method of installing a foam on the surface of crude oil in a tank which comprises providing a flow of crude oil to the tank, withdrawing a portion of crude oil from the flow and passing it through a venturi to provide a pressure below atmospheric pressure at the venturi throat, introducing into the flowing crude oil at the throat of the venturi a mass of discrete, spherical, oil-wettable, gas-filled, hole-free particles of a solid material inert to crude oil, which particles have an average diameter from 25 to 250 microns and have a liquid displacement density of from 0.05 to 0.5, and adding the crude oil particles mixture to the remaining crude oil flowing to the tank, whereupon the particles in the tank will rise to the surface and form a foam in which the particles will occupy about 20 to 70% by volume of the foam.

3. A method of installing a foam on the surface of crude oil in a tank which comprises flowing crude oil to a manifold selectively communicating with various levels in the tank, bypassing a portion of the flow through a venturi to provide a pressure below atmospheric pressure at the venturi throat, introducing into the crude oil flowing through the throat of the venturi a mass of discrete, spherical, oil-wettable, gas-filled, hole-free particles of a solid material inert to crude oil, which particles have an average diameter from 25 to 250 microns and have a liquid displacement density of from 0.05 to 0.5, and returning the crude oil-particles mixture to the flow, whereupon the particles in the tank will rise to the surface and form a foam in which the particles will occupy about 20 to 70% by volume of the foam.

4. A method as defined in claim 3 wherein the particles are formed from a phenol-formaldehyde resin.

References Cited in the file of this patent

UNITED STATES PATENTS

| | | |
|---|---|---|
| 1,678,225 | Kincade | July 24, 1928 |
| 2,423,801 | Sloan | July 8, 1947 |